United States Patent [19]

Singelyn et al.

[11] Patent Number: 4,774,154
[45] Date of Patent: Sep. 27, 1988

[54] EXPANDED HIGH-TEMPERATURE STABLE CHEMICAL RESISTANT SEAL MATERIAL

[75] Inventors: James D. Singelyn, Newington; Raymond L. Gelting, Manchester; Anthony P. Mientek, Glastonbury, all of Conn.

[73] Assignee: International Fuel Cells, South Windsor, Conn.

[21] Appl. No.: 909,658

[22] Filed: Sep. 22, 1986

[51] Int. Cl.$^4$ .............................................. H01M 2/08
[52] U.S. Cl. ........................................ 429/36; 429/34; 429/35; 429/179; 429/185
[58] Field of Search .................................... 429/34–36, 429/179, 185

[56] References Cited

U.S. PATENT DOCUMENTS 3,868,337  2/1975  Gros .................................. 264/54 X
4,174,244  11/1979 Thomas et al. ...................... 156/242
4,374,185  2/1983  Powers et al. ......................... 429/36
4,385,018  5/1983  Kutnak .............................. 264/45.9

Primary Examiner—Brian E. Hearn
Assistant Examiner—Stephen J. Kalafut

[57] ABSTRACT

A seal material having improved sealing characteristics and useful in high temperature, corrosive environments, particularly fuel cells is disclosed. The material comprises an acid resistant, high temperature stable fluorinated elastomer and a blowing agent which activate at a temperature within the range of curing temperatures of the elastomer. Improved sealing characteristics due to volume expansion of the seal material applied and activated within the fuel cell were observed. The process of activating the seal material at the operating temperature of the fuel cell is also disclosed.

The invention also discloses the process of using the seal material within a fuel cell.

21 Claims, 1 Drawing Sheet

EXPANDED HIGH-TEMPERATURE STABLE CHEMICAL RESISTANT SEAL MATERIAL

DESCRIPTION

1. Technical Field of the Invention

The invention relates to seal materials, and particularly to materials useful in fuel cells.

2. Background Art

Fuel cells are devices which use a reactant gas, such as hydrogen, to generate a DC electric current. They are comprised of a fuel cell housing enclosing a fuel cell stack, which consists of generally rectangular fuel cell plates, including anodes, cathodes and cooling plates. The fuel cell housing has at least one inlet port through which reactant gas may be supplied, one outlet port through which exhausted gas may be withdrawn, and at least one pair of fluid ports through which inlet and outlet cooling fluid streams may be respectively supplied and withdrawn from the cooling plates.

The anodes, cathodes, and cooling plates are layered in register to form the fuel cell stack, and an electrolyte solution, often phosphoric acid, is contained within the fuel cell stack in a space between adjacent surfaces of anodes and cathodes. The anodes and cathodes are provided with channels for the purpose of conducting gases, reactant gas from a supply manifold, and exhausted gas to an exhaust manifold. These manifolds are connected to tubes passing through the fuel cell housing which serve as inlet and outlet ports for the respective manifolds.

The cooling plates layered among the fuel cell plates in the fuel cell stack are provided for the purpose of controlling the operating temperature of the fuel cell. This temperature is usually about 400° F. The cooling plates contain a tube within which a cooling fluid circulates, and the ends of the tube are connected to tubes passing through the fuel cell housing, which serve as fluid ports.

Throughout the fuel cell, seals play an important role in the operation of the fuel cell. They are present in many critical locations for the purpose of isolating various parts of the fuel cell from one another, and containing gases and fluids. More specific examples include the use of seals to contain the electrolyte solution between adjacent anodes and cathodes, to insulate the edges of the individual fuel cell plates in the fuel cell stack from the manifolds, and insulate the manifolds from one another. Additionally, seals are provided between the fuel cell housing and the exterior walls of tubes or ports which pass through the fuel cell housing.

As noted in commonly assigned U.S. Pat. No. 4,374,185 which is herein incorporated by reference, commercially available seal materials are generally unsatisfactory, and none is available which fulfills all the necessary requirements. The cited patent was granted for a superior seal material, but there remains a continuing need in the art for a seal material which may withstand the environment of the cell and has improved sealing properties.

DISCLOSURE OF THE INVENTION

A seal material is disclosed which is physically and chemically stable at the normal operating temperature of a fuel cell, e.g. about 400° F, which is corrosion resistant to the electrolytic solution used in the fuel cell stack and which exhibits improved sealing characteristics over other seal materials. The seal material comprises the combination of a fluorinated hydrocarbon elastomer, and a blowing agent which activates within the range of curing temperatures of the elastomer so to produce a fully cured closed cell elastomer.

Another aspect of the invention is to provide a fuel cell wherein a seal material comprising a fully cured corrosion resistant high temperature stable closed cell elastomer is used to seal the edges of adjacent anode plates and cathode plates in a fuel cell stack.

Another aspect of the invention is to provide a fuel cell having at least two manifolds, wherein a seal material comprising a fully cured corrosion-resistant high temperature stable closed cell elastomer is used between the two manifolds.

A further aspect of the invention is to provide a fuel cell having at least one tube passing through the fuel cell housing wherein a seal material comprising a fully cured corrosion-resistant high temperature stable closed cell elastomer is used to form a seal between the exterior of the tube and the fuel cell housing.

A yet further aspect of the invention is to provide a method of sealing structural irregularities in a fuel cell by applying a seal material to the structural irregularities in the fuel cell where the seal material comprises a fully cured corrosion-resistant high temperature stable elastomer and a blowing agent which activates within the curing temperature range of the elastomer, and heating the fuel cell to its maximum operating temperature so to produce a fully cured closed cell elastomer.

Other features and advantages of the present invention will become apparent in light of the following description thereof.

BEST MODE FOR CARRYING OUT THE INVENTION

Figure 2:
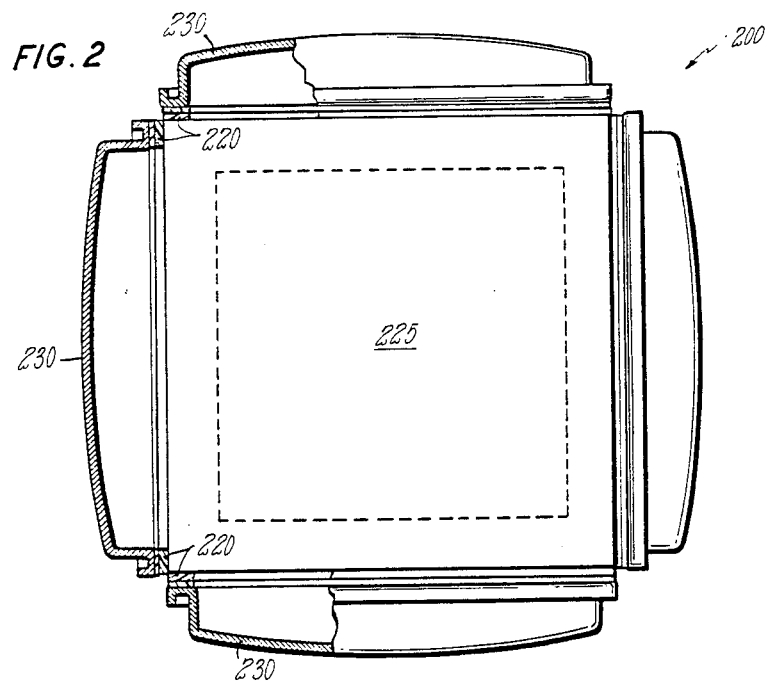
FIG. 2 shows a top view of a fuel cell, showing the fuel cell housing which is partly broken away to show the use of the seal material to form edge seals beween the fuel cell stack and manifolds.

Suitable elastomers which may be incorporated into the invention are those which have a range of curing temperatures which are less than to about the normal operating temperature of the fuel cell in which they are used, (typically about 400° F). Further, the elastomer is physically stable at the normal operating temperature of the fuel cell, exhibit satisfactory electrical insulating properties, and are resistant to corrosion by the electrolyte solution used in the fuel cell under normal operating conditions. Preferably, the elastomer is a fluorinated hydrocarbon which exhibits good resistance to corrosion by the electrolyte solution used in the cell. Examples of suitable elastomers include FLUOREL ® elastomer available from 3M Corporation and VITON TM elastomer available from E. I. Du Pont de Nemours. Most preferably, the elastomer is a fully-saturated fluorinated hydrocarbon elastomer.

In the preferred embodiment, a fully saturated fluorinated hydrocarbon elastomer with the highest commercially available fluorine content, about 69% was used. This material was FLUOREL FLS 2330 TM, elastomer commercially available from 3M Corporation in the form of slabs. FLUOREL FLS 2330 elastomer exhibits high dielectric strength, excellent resistance to corrosion by the electrolyte solution used at the operating temperature of the fuel cell, and flows within the temperature range of about 350° F. to about 400° F., at pressures between about 40 psi and about 50 psi in its uncured state, the maximum curing temperature being approximately equal to the normal operating temperature of the fuel cell.

A suitable reinforcing filler which may be added flows between temperatures of about 350°–400° F. at pressures between about 40–50 psi in its uncured state, to improve the processing and molding characteristics of the invention are finely divided materials which are stable at the normal operating temperature of the fuel cell, and which do not suffer unacceptable corrosion by the electrolytic solution at the normal operating temperature of the fuel cell. Preferably, the reinforcing filler is carbon black, as it exhibits the above-mentioned properties. One suitable form commerically available is THERMAX MT TM carbon black which is a medium temperature carbon black, available from R. T. Vanderbilt & Co., Norwalk, Conn.

A suitable blowing agent is one which has an activation temperature within the curing range of the elastomer. Preferably, the blowing agent is an azodicarbonamide whose activation temperature is within the curing range of the elastomer. Most preferably, the blowing agent is CELOGEN TM AZ-130 azocarbonamide whose activation temperature is about 380° F. This temperature falls within the curing temperature of the most preferred elastomer, Fluorel FLS 2330 elastomer which was from about 350° F. to about 400° F. The blowing agent, CELOGEN AZ-130 azodicarbonamide is available from Uniroyal Chemical, Naugatuck Conn.

A blowing agent promoter which adjusts the activation of the blowing agent to a temperature range which falls within the curing temperature range of the elastomer may be used. The blowing agent promoter may also be used to increase or decrease the normal activation temperature of the blowing agent by varying the arrangement present in the seal material in order to fall within the range of curing temperatures of the elastomer used. Preferably the blowing agent promoter is B-I-K TM azodicarbonamide blowing agent, used for promoting activation of CELOGEN AZ -130 azodicarbonamide B-I-K promotes the activation of CELOGEN AZ-130 azodicarbonamide about 380° F., and is commercially available from Uniroyal Chemical.

A material which functions as an acid acceptor, acting to absorb any acid released during the curing and blowing process of the seal material, and which does not suffer appreciable corrosion from the electrolyte solution used at the normal operating temperature of the fuel cell may be used. Preferably, such materials are epoxies and inorganic oxides. Most preferably a precipitated magnesium oxide, such as MAGLITE D TM inorganic oxide which is commercially available from Whittaker, Clark and Daniels Co., Plainfield, N.J.

The above-recited materials, namely the elastomer, reinforcing filler, blowing agent, blowing agent promoter and acid accepting material are combined to form a seal material which exhibits desirable sealant characteristics when cured. These include acceptable corrosion resistance to the electrolyte at the operating condition of the fuel cell and high dielectric strength at the operating temperature of the fuel cell. Further, the seal material exhibits good handling characteristics, still further the seal material cures in a temperature range whose highest temperature is less than to about the operating temperature of the fuel cell, thus ensuring that the seal material may be fully cured by heating the fuel cell to its normal operating temperature.

The composition of the seal material should include the elastomer, reinforcing filler, blowing agent, blowing agent promotor, and acid acceptor. The ratio of these combined materials should be in a proportion to form a seal material which has the properties outlined above and which further include the characteristic property of volume expansion during the curing process of the seal material. The proportions of the seal materials are determined by experimentation for any particular application.

The composition of the seal material is preferably within the following ranges: flouroelastomer between 60 and 85 parts by weight, filler between 15 and 30 parts by weight. Acid acceptor between 5 and 20 parts by weight, blowing agent between 0.3 and 3 parts by weight and blowing agent activator between 0.1 and 1 parts by weight. Further, a curing agent may be present in a ratio of 0.2 and 5 parts by weight, which is often a latent catalyst incorporated into the fluroelastomer by the manufacturer. If it is omitted by the manufacturer, it may be included within the proportion outlined above.

More preferably, the fluoroelastomer composition is between 75 and 85 parts by weight, filler between 10 and 15 parts by weight. Acid acceptor between 10 and 15 parts by weight, and blowing agent activator between 0.5 and 1.5 parts by weight.

The use of a blowing agent exerts a positive pressure within the seal material and acts to expand the seal material in volume, forcing the seal material into any void spaces which the uncured and unexpanded seal material would not normally fill. Commonly, such void spaces are present as structural irregularities in the fuel cell stack, particularly among the edges of the fuel cell plates. Preferably, the blowing agent is present in an amount to effect a volume expansion of the seal material between about 0 and about 200 percent. More preferably the blowing agent is present in an amount to effect a volume expansion of the seal material between about 50 and about 100 percent. This assures that the seal material forms a "closed cell" elastomer, where the cells contain trapped gas within the elastomer which is released by the activated blowing agent. This range of volume expansion is desirable as the seal material in its fully expanded and cured form to assure that the seal material remains sufficiently dense to exhibit desirable sealing characteristics.

The blowing agent must be activated at a temperature within the range of curing temperatures of the elastomer. This insures that the elastomer is partially cured, sufficient to retain the gas formed by the activated blowing agent, ensuring that "blowout" does not occur. Blowout is an undesirable condition wherein the gas formed by the blowing agent is released without expanding the elastomer.

Figure 1:
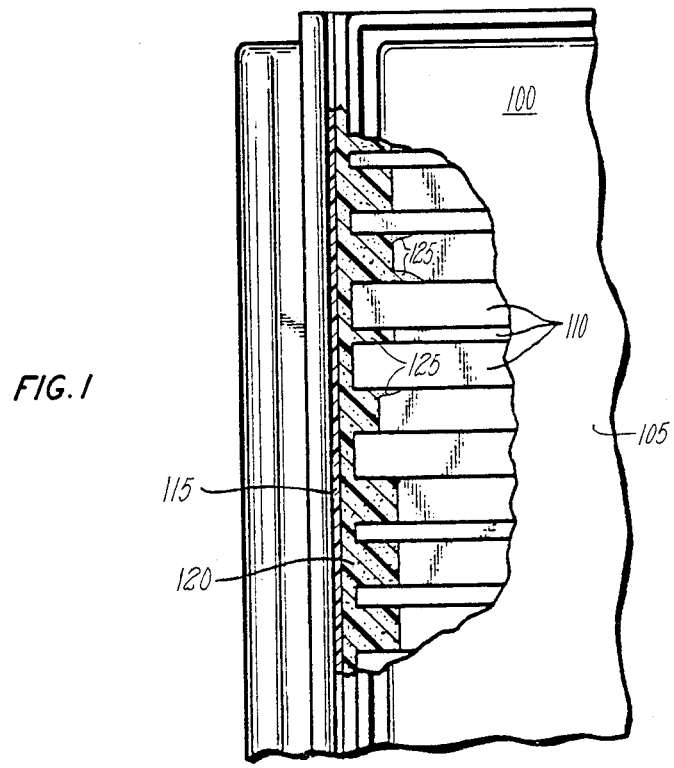
FIG. 1 shows a broken away side view of the fuel cell, showing the fuel cell housing, the fuel cell plates and the seal material disposed between the fuel cell plates and the fuel cell housing.

FIG. 1 shows a broken away side view of a fuel cell 100. A portion of the fuel cell housing 105 is broken away to show fuel cell plates, 110, a layer of packing material such as polytetrafluoroethylene fiber or tape 115, and the seal material 120 in its expanded and cured form. Note the irregularities 125 into which the seal material has expanded.

FIG. 2 shows a top view of the fuel cell 200. A portion of the fuel cell housing 205 is broken away, showing the use of the seal material 220 between the fuel cell stack 225, and the manifolds 230.

EXAMPLE

In one embodiment of the invention, a fuel cell whose operating temperature was about 400° F., and which contained phosphoric acid was used. A seal material having the composition shown in the Table was combined in a rubber mill. After the seal material was thoroughly mixed it was calendared and slit into strips which were placed on a rope of polytetrafluoroethylene used as a packing material. Then, the strips were placed against the manifold edges and at the edges of the fuel cell stack. Seal material was also formed into a sleeve which was placed over the inlet and outlet cooling fluid ports during the assembly of the cell. Once assembled, the cell was steadily heated from room temperature to its normal operating temperature of 400° F. It was observed that the seal material began to flow and begin curing at about 350° F., the blowing agent activated at about 380° F., which was followed by final curing at about 400° F. Heating was then stopped and the fuel cell allowed to cool to room temperature.

TABLE

| Chemical | Parts by Weight |
| --- | --- |
| Fluorel FLS 2330 TM elastomer | 100.0 |
| Thermax MT TM carbon black | 15.0 |
| Maglite D TM inorganic oxide | 15.0 |
| Celogen AZ-130 TM azodicarbonamide | 0.3 |
| B-I-K TM azodicarbonamide | 0.1 |

The seal material disclosed is able to withstand a highly corrosive environment, retain physical integrity at the temperature range of fuel cell operation and to have a useful operating life at least equal to that of the fuel cell which is optimally about 40,000 hours. Further, the seal material disclosed is readily conformable to structural irregularities in the fuel stack including irregularities between the fuel cell stack and manifolds, fuel cell stack plates, particularly among the edges of the fuel cell plates in the fuel cell stack and between the outside wall of tubes passing through the cooler assembly. Further, the seal material is readily applied during the assembly of the fuel cell and provides a superior seal due to formation in situ of the seal material when activated during heating up of the fuel cell.

It is to be understood that other materials, and other compositions may be used to form a suitable seal material without detracting from the scope or spirit of the invention.

I claim:

1. A phosphoric acid fuel cell having a fuel cell housing containing a fuel cell stack which is comprised of layered fuel cell plates having edges including adjacent anode and cathode plates having small gaps therebetween for containing an electrolyte solution including seal material which forms a seal between the edges of adjacent anodes and cathode plates wherein the improvement comprises:
using a seal material comprising:
a corrosion resistant, high temperature stable fluorinated hydrocabon elastomer;
a blowing agent which activates within the range of curing temperatures of the fluorinated hydrocarbon elastomer so as to produce a fully cured closed cell elastomer;
resulting in improved sealing between structural irregularities in the fuel cell.

2. The fuel cell as recited in claim 1 wherein said seal material further comprises a blowing agent promotor.

3. The fuel cell as recited in claim 1 wherein said seal material further comprises a reinforcing filler.

4. The fuel cell as recited in claim 1 wherein said seal material further comprises an acid accepting material.

5. The fuel cell as recited in claim 1 wherein the fluorinated hydrocarbon elastomer is fully saturated.

6. The fuel cell as recited in claim 1 wherein the blowing agent is an axodicarbonamide.

7. The fuel cell as recited in claim 1 having an operating temperature of about 400° F.

8. A phosphoric acid fuel cell having a fuel cell housing containing at least two manifolds and seal material between the two manifolds;
wherein the improvement comprises:
using a seal material comprising:
a corrosion resistant, high temperature stable fluorinated hydrocarbon elastomer;
a blowing agent which activates within the range of curing temperatures of the fluorinated hydrocarbon elastomer so as to produce a fully cured closed cell elastomer.

9. The fuel cell as recited in claim 8 wherein said seal material further comprises a blowing agent promoter.

10. The fuel cell as recited in claim 8 wherein said seal material further comprises a reinforming filler.

11. The fuel cell as recited in claim 8 wherein said seal material further comprises an acid accepting material.

12. The fuel celll as recited in claim 8 wherein teh fluorinated hydrocarbon elastomer is fully saturated.

13. The fuel cell as recited in claim 8 wherein the blowing agent is an azodicarbonamide.

14. The fuel cell as recited in claim 8 having an operating temperature of about 400° F.

15. A phosphoric acid fuel cell having a fuel cell housing and at least one tube passing through the fuel cell housing and seal material forming a seal between the exterior of the tube and the fuel cell housing;
wherein the improvement comprises:
using a seal material comprising:
a corrosion resistant, high temperature stable fluorinated hydrocabon elastomer;
a blowing agent which activates within the range of curing temperatures of the fluorinated hydrocarbon elastomer so as to produce a fully cured closed cell elastomer.

16. The fuel cell as recited in claim 15 wherein said seal material further comprises a blowing agent promoter.

17. The fuel cell as recited in claim 15 wherein said seal material further comprises a reinforcing filler.

18. The fuel cell as recited in claim 15 wherein said seal material further comprises an acid accepting material.

19. The fuel cell as recited in claim 15 wherein the fluorinated hydrocarbon elastomer is fully saturated.

20. The fuel cell as recited in claim 15 wherein the blowing agent is an azodicarbonamide.

21. The fuel cell as recited in claim 15 having an operating temperature of about 400° F.

* * * * *